Figure 1:
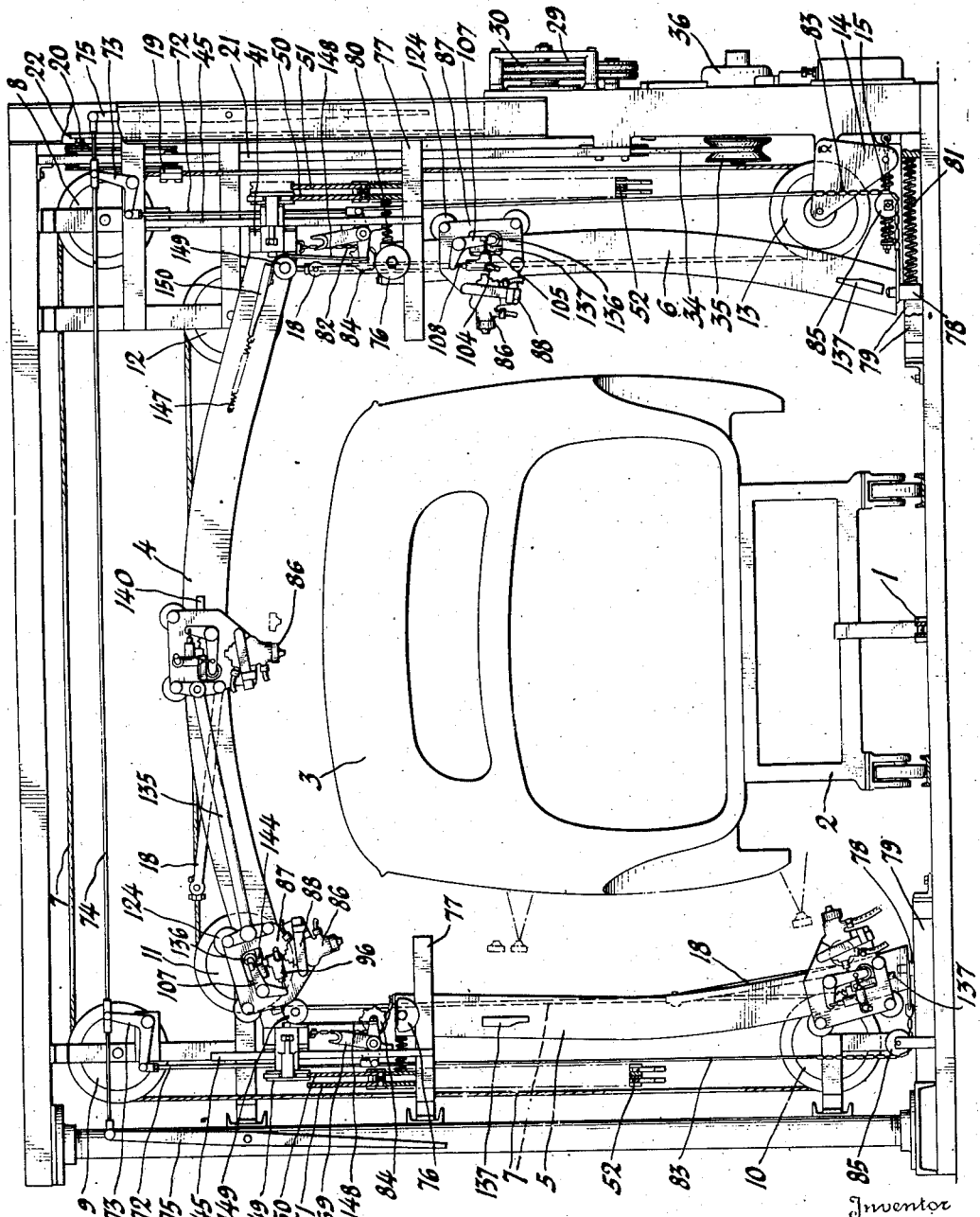

June 15, 1937.　　T. F. BRACKETT　　2,083,634
SPRAYING MACHINE
Filed Jan. 11, 1936　　6 Sheets-Sheet 1

Inventor
Tracy F. Brackett
By Blackmore, Spencer & Flint
Attorneys

June 15, 1937. T. F. BRACKETT 2,083,634
SPRAYING MACHINE
Filed Jan. 11, 1936    6 Sheets-Sheet 2
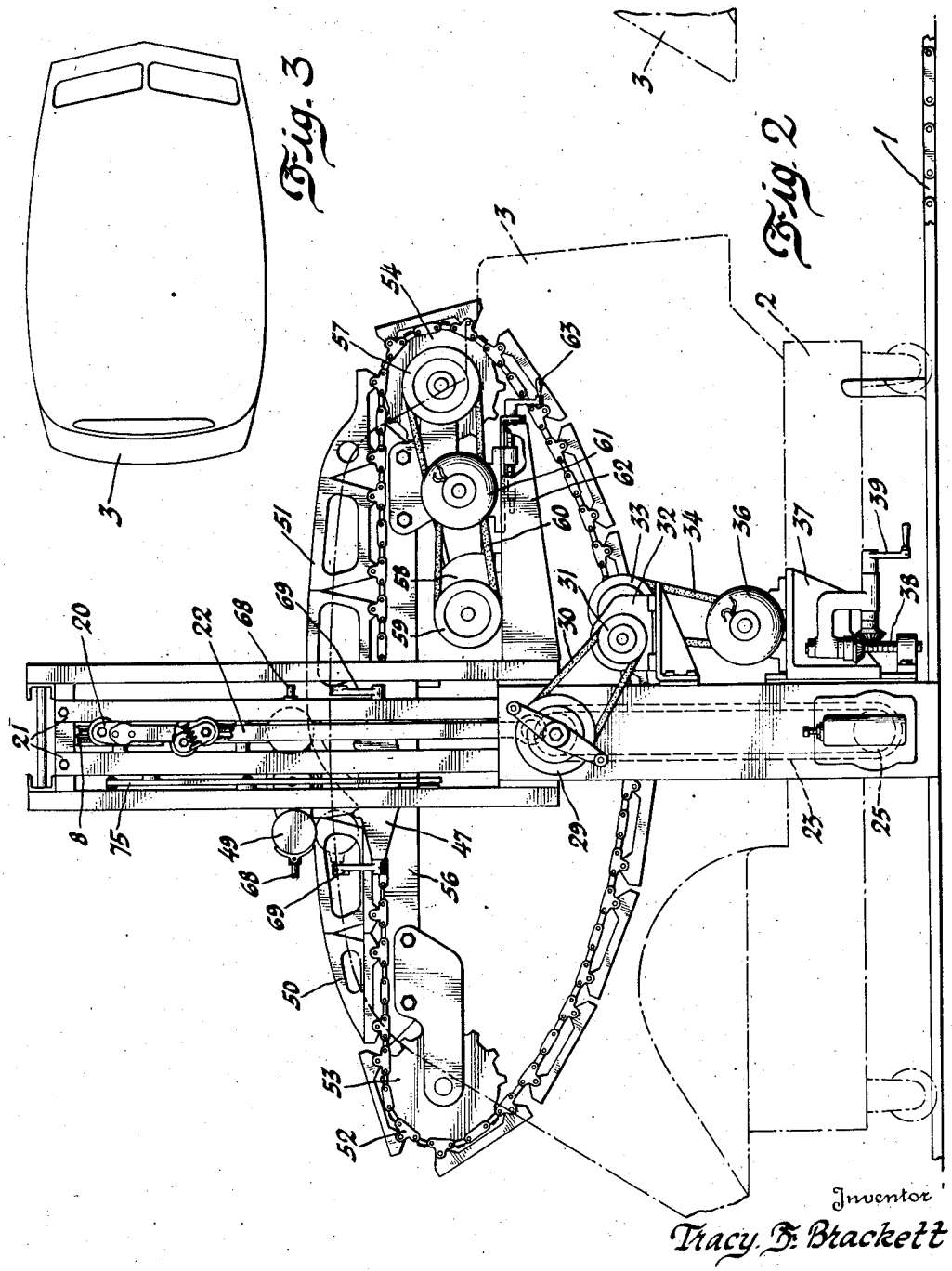
Inventor
Tracy F. Brackett
By Blackmore, Spencer & Flint
Attorneys June 15, 1937.  T. F. BRACKETT  2,083,634
SPRAYING MACHINE
Filed Jan. 11, 1936   6 Sheets-Sheet 3
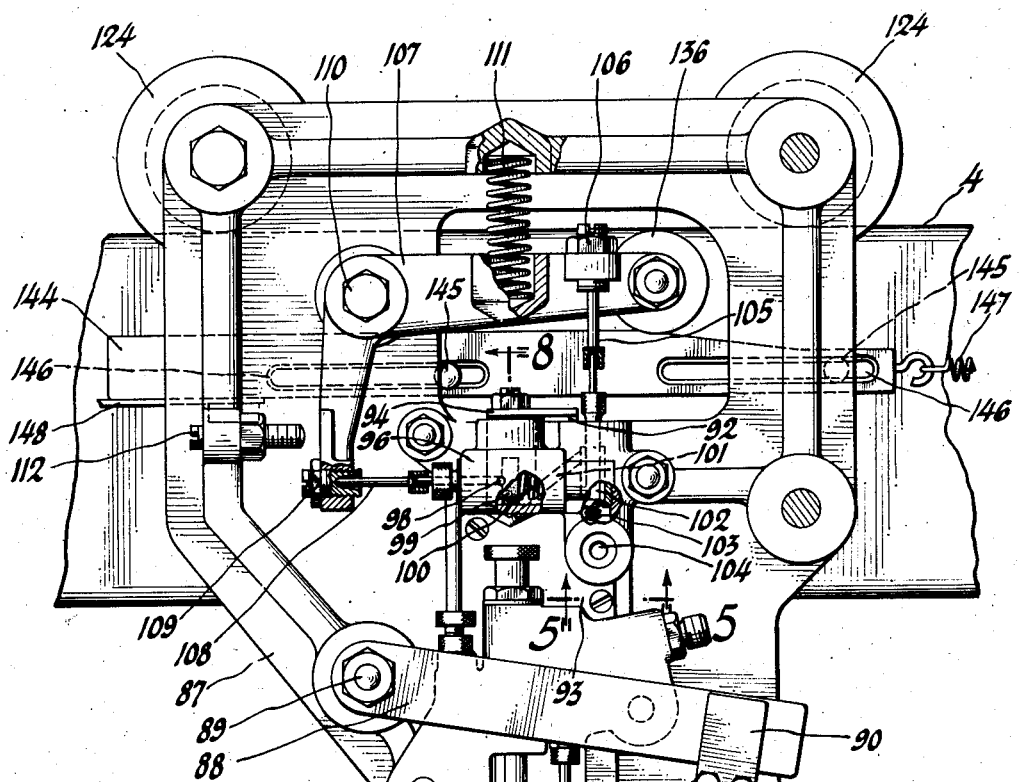
Fig. 4
Fig. 5
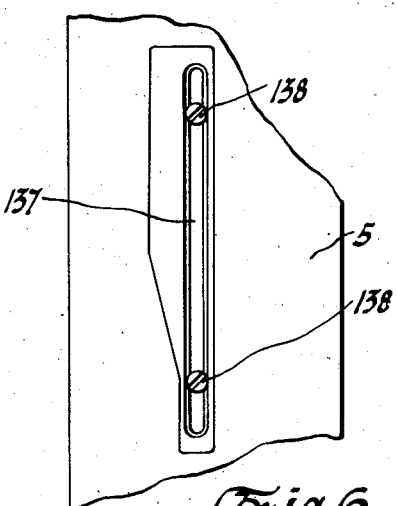
Fig. 6
Inventor
Tracy F. Brackett
By Blackmore, Spencer & Flint
Attorneys June 15, 1937.  T. F. BRACKETT  2,083,634
SPRAYING MACHINE
Filed Jan. 11, 1936  6 Sheets-Sheet 4
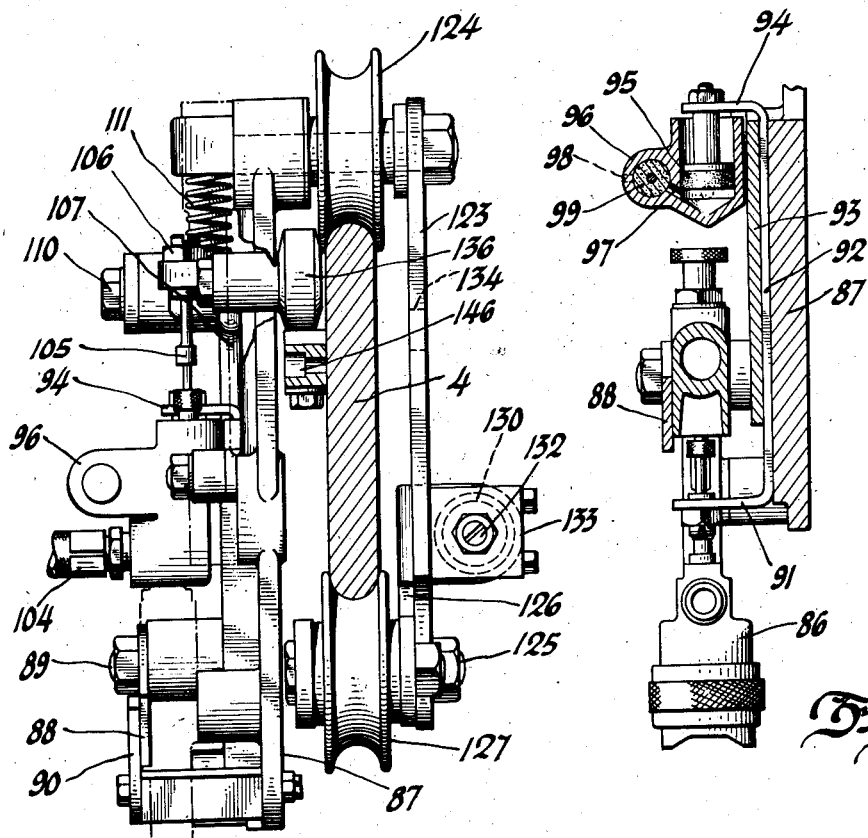
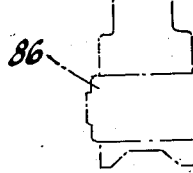
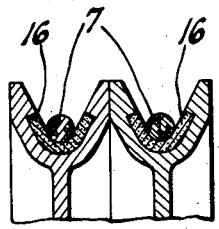
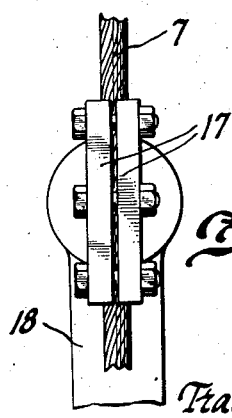
Inventor
Tracy F. Brackett
By Blackmore, Spencer & Flint
Attorneys June 15, 1937. T. F. BRACKETT 2,083,634
SPRAYING MACHINE
Filed Jan. 11, 1936 6 Sheets-Sheet 6

Inventor
Tracy F. Brackett

By Blackmore, Spencer & Flint
Attorneys

Patented June 15, 1937

2,083,634

UNITED STATES PATENT OFFICE 2,083,634

SPRAYING MACHINE

Tracy F. Brackett, Detroit, Mich., assignor to General Motors Corporation, Detroit, Mich., a corporation of Delaware Application January 11, 1936, Serial No. 58,641

18 Claims. (Cl. 91—45)

This invention has to do with the painting of automobile bodies on a large production basis and relates to automatic machinery which has been found to do a better job quicker at less cost both for labor and material and with uniformity of product. While the invention may be embodied in machines for other uses than the painting of automobile bodies it was designed especially with reference to the maintenance of the spray gun, through which the coating material is applied, in given spaced relation and at right angles to the curved surfaces found in current body styling. For pleasing appearance, curved paneling is used so that the top and side walls are curved in all directions and this presents problems in keeping the gun tip properly located with reference to the immediate surface being coated.

In the preferred embodiment of the invention, the assembled bodies are sprayed during their continuous movement on a traveling conveyor by one or more reciprocating guns guided by transversely extending tracks. Where the top and both sides are to be covered at the same time, a common drive may be employed for the reciprocation of several guns running on tracks positioned overhead and on each side of the body, respectively. The tracks are contoured to guide the guns through arcuate paths substantially corresponding to the transverse curvature of the body and in order that the guns may additionally follow longitudinal curvature, the tracks are movable in the machine, and a contour ramp having a profile corresponding generally to the longitudinal curvature and operating in timed relation to conveyor travel is provided to vary track position. That is to say, in the progression of the bodies the tracks move in or out as the surface presented to the guns changes in plane due to body contour curvature. Therefore, track movement and profile maintain a substantially uniform spacing between the surface and the spray nozzles which is necessary to insure proper coverage with minimum of coating material. In this connection it may be pointed out that the top and sides of most bodies have the same curvature longitudinally, wherefore but a single contour ramp is needed for imparting movement to the several tracks in unison. This makes for simplicity of construction but it will be understood that individual track moving mechanism may be provided if deemed desirable.

Inasmuch as the upper portions of the side walls are constituted almost wholly by window openings it is proposed to spray only the lower half of the sides in the machine and to coat the window posts by hand in the usual manner. Accordingly, the range of travel of the side guns is only about one half the distance across the roof and for this reason the overhead track is provided with a pair of guns, one for each half of the upper surface, whereby the range of reciprocation for all the guns is the same and all may be driven in unison by common drive means. In any event the range of travel between opposite ends of the gun stroke exceeds the length of the surface to be coated and the gun overrides the surface at each end. In the overrun deceleration and reversal of direction occurs but elsewhere the rate of travel is constant. This makes for uniform thickness of deposition entirely across the surface.

To eliminate overshooting the surface at the ends and the waste of paint, provision is made for cutting off the flow at the end of the surface to be coated. To that end each track carries cam abutments for engagement at selected points with valve operating mechanism associated with the traveling guns. In the case of the side tracks the cam abutments may be fixed in definite spaced relation inasmuch as the width of the side surface to be coated is the same throughout the length of the body. However, the width of the roof undergoes continuing change from front to rear and to take care of the variation the interval of valve actuation should be adjustable. Therefore, the abutments at opposite ends of the overhead track are slidably mounted and their relative positions are changed to agree with the width variations in the roof. Variation in width is substantially proportional to the longitudinal curvature of the roof and in consequence thereof, the sliding of the cam abutments on the overhead track may be dependent upon vertical movement of the track by connecting one end of each movable abutment to a fixed part of the machine.

Figure 11:
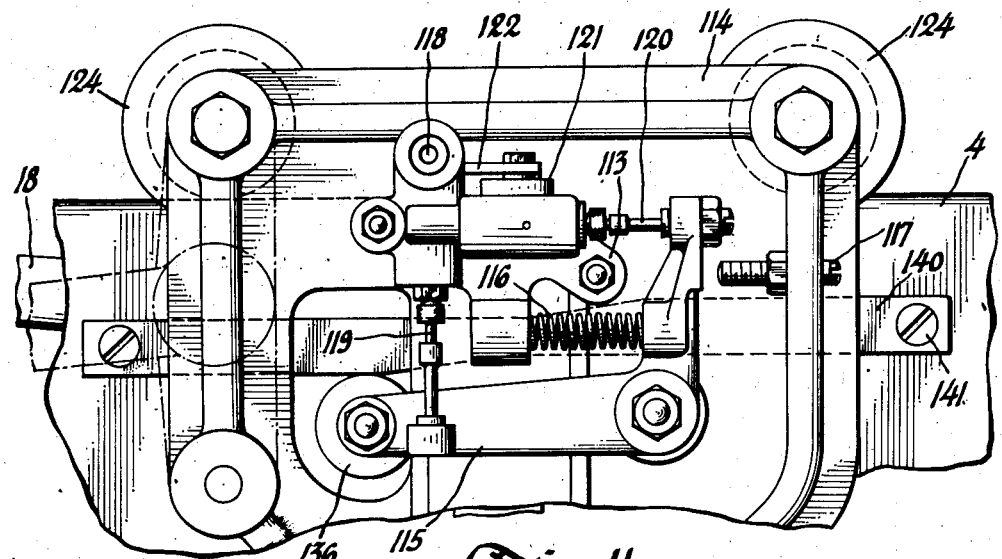
Figure 12:
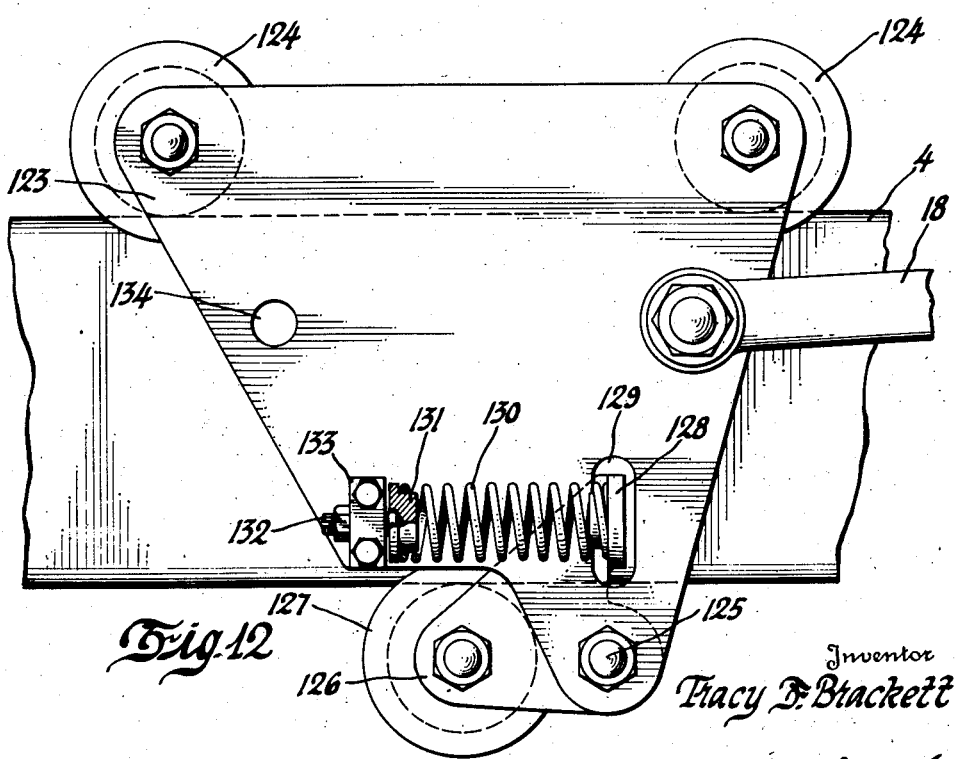
Figure 14:
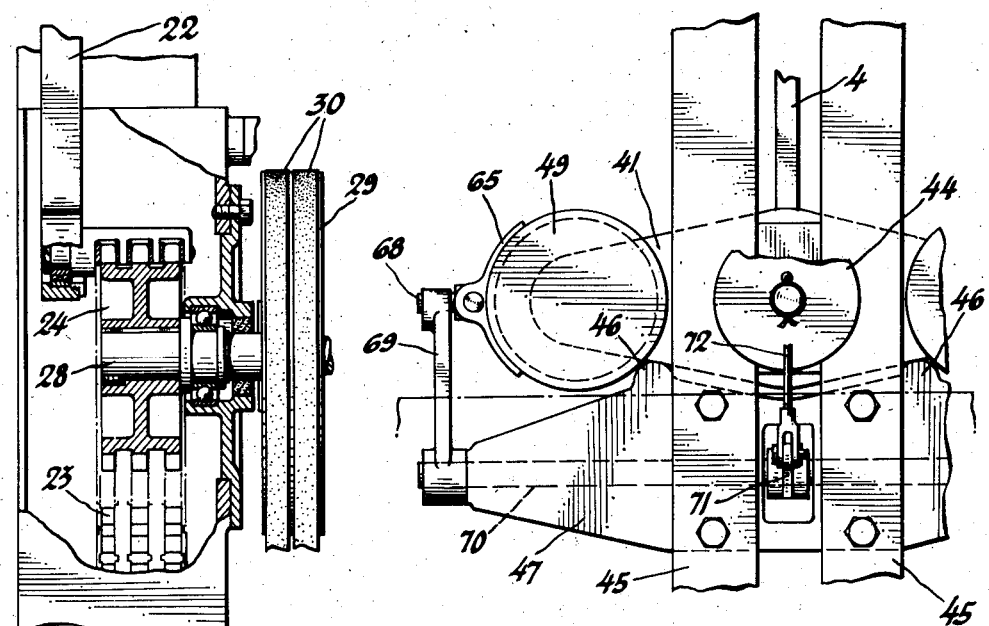
Figure 13:
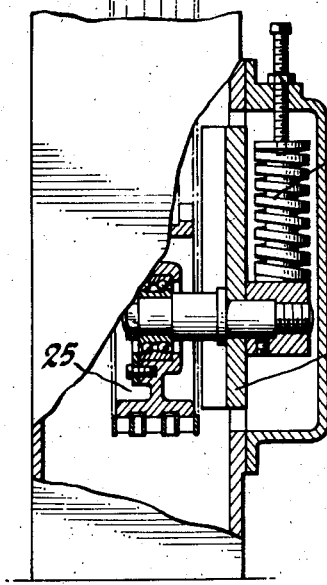
Figure 15:
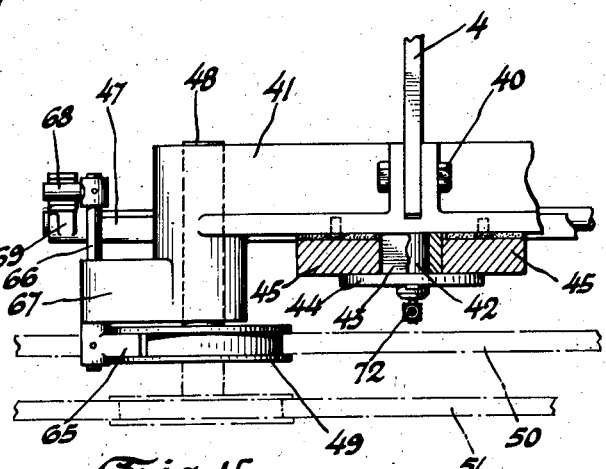

For a more complete explanation reference is made to the accompanying drawings wherein Figure 1 is an elevation of the complete assembly with a few parts broken away and shown in section; Figure 2 is a side elevation of a machine showing with particularity the arrangement of the contour ramp by which track movement is effected in conformity to longitudinal curvature of the body; Figure 3 is a top plan view of a body; Figure 4 shows one of the traveling gun carriages; Figure 5 is a detail sectional view taken on line 5—5 of Figure 4; Figure 6 shows a fragment of one of the side tracks and the mounting of one of the fixed valve actuating abutments; Figure 7 is a side elevation of the gun carriage shown in Figure 4; Figure 8 is a sectional view taken on line 3—3 of Figure 4; Figure 9 is a section showing the structure of the pulleys engaged by the double belt drive for the gun carriages; Figure 10 shows a belt clamp through which connection is made between the belt and a connecting rod; Figure 11 is a front elevation of one of the gun carriages; Figure 12 is a rear view of a carriage; Figure 13 shows partly in section the mechanism for converting rotary into reciprocatory drive motion for the guns, and Figures 14 and 15 are side and top views, respectively, of one of the bearing members, which ride the contour ramp and afford supports for the opposite ends of the overhead track.

Referring to the drawings, the framework of the machine includes spaced vertical standards and an overhead tie beam in straddling relation to a conveyor line. The conveyor runs on the floor and may be in the form of a chain 1 which drags along a succession of dollies 2 on each of which rests an automobile body 3. The side and top walls of the body which are to be painted, are curved transversely as seen in Figure 1 and also longitudinally as seen in Figures 2 and 3. The body is wider and higher in the middle and recedes or tapers to opposite ends.

In conformity to transverse body curvature the arcuate top track or rail 4 and the two side tracks or rails 5 and 6 are provided for guiding reciprocating gun carriages in paths that follow in given spaced relation the surfaces traversed. The several gun carriages are operatively connected to a reciprocating endless belt or cable 7 which runs over pulleys or sheaves 8, 9, 10, 11, 12, and 13 mounted on the framework. For taking up slack the last mentioned sheave is supported between a pair of pivoted plates 14 and a pressure spring 15 exerts a constant elastic force against the plates to urge the sheave downwardly.

Because of the work to be done it is proposed that the reciprocating belt 7 be in the form of two separate cables as shown in Figure 9 and that each pulley contain a double groove to receive the cables. To prevent slippage and provide a wear surface, the grooves may be lined with brake lining as at 16. Connections between the drive belt and the several guns may include a pair of clamp plates 17 engaging the belt as shown in Figure 10 to which is swiveled a connecting rod 18.

A similar connection 19 is carried by the belt in the length thereof extending between the vertically spaced pulleys 13 and 8 for connection with a carriage 20 guided in a vertical path between a pair of rails 21 engaged by suitable rollers on the carriage. The carriage 20 is reciprocable and is driven through a connecting rod or link 22 from an endless chain 23 as seen in Figure 13. This chain is contained within a housing forming a part of one of the vertical frame standards and operates on a pair of spaced sprockets 24 and 25. By reason of this endless chain and connecting rod assembly, a uniform speed is imparted to the drive belt 7 except for the interval in which the joint between the rod and chain moves around the sprockets 24 and 25 and during which no spraying is done.

The lowermost sprocket 25 has a bearing on a stub shaft mounted in a slide plate 26 against which an adjustable compression spring 27 bears to take up slack in the chain and absorb some of the inertia shock incident to reversal of the direction of movement of the joint between the chain 23 and the connecting rod 22. The other sprocket wheel 24 is connected to a shaft 28 rotatably supported in the standard and projecting through the wall thereof for the attachment of a double pulley 29 driven by belts 30 from a pulley 31 associated with a gear reduction box 32. The last mentioned belt drive is so constructed as to allow a slippage under strain resulting from inertia shock. Power input to the gear box is through a pulley 33 and a belt 34 driven from an expansible pulley 35 associated with an electric motor 36 and the motor is mounted on a slidable pad 37 which may be raised or lowered through the agency of a jack screw 38 operated through a bevel gearing by a handle 39. This adjustment effects changes in speed by applying tension on the belt 34 to vary the diameter of the belt engaging surfaces on the expansible pulley 35.

A similar variable speed drive arrangement is provided for moving roof contour ramps to raise and lower the overhead track in relation to the longitudinal sweep of the roof. At each end the track 4 is secured by bolts 40 (see Figure 15) to a vertically movable guide bar or cam follower 41 having a lateral stud 42 on which is mounted a roller 43 and a retainer plate 44 secured by a cotter pin or the like and adapted for engagement with a pair of spaced vertical guide rails 45. In its lowermost position the follower rests upon suitable stops shown in Figure 14 as consisting of a pair of spaced ears 46 on a bearing member 47 bolted or otherwise secured to the stationary guide rails 45. Each end of the follower slidably mounts an axle shaft 48 carrying a flanged roller 49 for riding engagement with one or the other of a pair of segmental cam rails or ramps 50 and 51, both carried on an endless chain 52 running on spaced sprocket wheels 53 and 54 as best seen in Figure 2. These sprockets are pivoted between a pair of plates on a horizontal bar 55 and the shaft for the sprocket 54 carries a pulley 57 driven by a belt from a gear reduction box 58. An expansible pulley 59 associated with a gear box mechanism is driven by a belt 60 from an electric motor 61 which is slidably mounted upon a supporting arm 62 to various positions of adjustment through a screw jack and handle 63. This affords a variable speed drive by which the operation of the chain 52 may be set to run at a rate corresponding to the travel of the conveyor line feeding the body through the machine.

Both cam rails comprise a series of short length plates pivotally joined at spaced points to links of the chain 52 in a way to accommodate the turning movement of the chain around the sprockets. On the upper reach between the sprockets the chain links maintain a straight line position with the several segments bearing against each other at their ends to provide a rigid continuous rail. Most of the segments have a straight line profile which lies below the rollers 49 in the position of rest of the follower 41. The remaining segments are higher and cam shaped to cooperate with one another in providing a ramp having a profile substantially conforming to the general longitudinal curvature of the roof for engagement with the rollers 49 to raise and lower the overhead track as the body surface brought into alinement with the spray nozzles approaches and recedes whereby the distance between the surface and the nozzles remains substantially constant. In addition the nozzles are maintained approximately square in relation to the body surface because the longitudinally spaced rollers 49 are canted and correspondingly tilt the track as they engage in succession the cam segments to ride up and then down the path provided. Tilting of the track is accommodated by the swiveled joints of the connecting rod 18 before mentioned, without interference to the transmission of drive from the belt 7 to the gun carriages.

One or more ramps may be provided, depending upon the number of body styles being dealt with, and in the drawings the ramps 50 and 51 vary in length and are intended, respectively, for use with sedan and coupe bodies. For shifting the rollers 49 from one rail to the other each has extending between the side flanges thereof an arcuate shoe 65 on the end of a shifter rail 66 slidable in a boss 67 on the follower 41 and provided with a lateral pin 68. In the lowered position of the follower 41 the pins 68 settle into the forked ends of a pair of spaced levers 69 on the opposite ends of a rockshaft 70 projecting through the bearing member 47. At an intermediate point the shaft 70 is keyed to a lever 71 and by means of a link 72 is connected to a bell crank 73 at the top of the framework. As seen in Figure 1 the two bell cranks 73 are joined to a tie rod 74 extending transversely across the machine with its opposite ends pivoted to hand levers 75 one at each side of the machine. Either hand lever may be used to actuate the linkage and shift the rollers 49 into position to be engaged by the selected contour ramps 50 and 51.

Inasmuch as the longitudinal curvature of the roof is much the same as the longitudinal curvature of the sides, separate mechanisms are not necessary for moving the side tracks 5 and 6 to keep the guns properly spaced in relation to the curved side surfaces in the forward movement of the body through the machine. Instead it is proposed to interconnect the tracks for movement in unison. Accordingly each side track has at its upper end a supporting roller 76 riding a laterally extending rail 77 to guide the track and additional guide means is provided at the bottom in the nature of a stud 78 slidable between a pair of spaced straps 79. Coil springs 80 and 81 at the top and bottom, respectively, urge the side tracks inwardly and straps 82 and 83 passing over rollers 84 and 85 are connected at opposite ends to the overhead track and to the side tracks at the top and bottom.

By reason thereof upward movement of the overhead track through the straps 82 and 83 pulls the side tracks outwardly against the springs 80 and 81 and the downward movement of the overhead track allows the side track to move inwardly under pushing force of the springs. Thus the several tracks move apart and crowd together to follow longitudinal body contour.

Coming now to the traveling gun carriages, each is arranged to hold removably a spray gun of a conventional well known type having flexible hose connections with a supply of paint and a supply of air under pressure. The detachable mounting enables a quick change to be made when succeeding bodies are to be painted different colors. In other words, a separate set of guns is provided for each color to be sprayed and each set is interchangeable. The structure of the gun carriages may be the same but in the drawings two distinct types are illustrated. Thus in Figure 1 of the drawings there are two carriages shown on the overhead track and the carriage on the left corresponds to the carriage on the right-hand side track 6 while the right-hand overhead carriage is the same structure as the carriage on the left-hand side track 5. Each involves a roller frame or plate supporting a pressure responsive device for controlling spray gun action and suitable valving controlling flow of air under pressure to the pressure responsive device and being operatively related to a rock lever arranged for engagement at selected points in the travel of the carriage with cam abutments to cut off paint flow.

Referring particularly to the left-hand carriage on the overhead track as seen in Figures 4, 7, and 8 the gun 86 is detachably clamped to the plate 87 by a swinging retainer strap 88 pivoted at one end as at 89 for engagement at its other end behind a clip 90. Engaging the valve operating opening plungers or stems of the gun 86 is a lateral flange 91 of a slider plate 92 guided within a recess in the face of the plate 87 behind a cover 93 secured by screw studs as seen in Figure 5. At the opposite or upper end of the slider 92 a lateral flange 94 is fastened to the stem of a piston 95 slidable within a bore of a valve casing 96 as seen in Figure 8. A lateral port 97 leading from the bottom of the piston chamber connects with a transverse chamber having a vent 98 and containing a slidable piston 99 adapted to close off the vent and provided with an operating spring 100 as shown in Figure 4. On the side of the piston opposite to the vent hole 98, a port 101 leads to a valved passageway in which is slidable a poppet valve 102 acting against a spring 103 to admit air under pressure through a flexible hose fitting 104.

The stem of the poppet valve extends beyond the casing 96 and has a rocking bearing within the recessed end of a stem 105 which is adjustably secured as by means of a set screw and lock nut assembly 106 to one leg of a bell crank 107. The piston valve 99 is likewise provided with a stem having a rocking bearing within the recessed end of a stem 108 associated with a set screw and lock nut assembly 109 in the other arm of the bell crank lever 107.

In the position of the parts shown in Figure 4 the flow of paint through the gun is cut off and the piston 99 is retracted to vent the pressure responsive device through the port 98, the poppet valve 102 being closed. When the valve is to be opened for the flow of paint the rock lever 107 is swung about its pivotal connection 110 on the plate 87 under influence of a compression spring 111, interposed between a ribbed formation on the plate and an adjacent leg of the bell crank until the other leg engages an adjustable stop in the form of a set screw and lock nut assembly 112 associated with a reinforcing web on the plate 87. In this position of the parts the valve 102 is moved from its seat to allow air under pressure to flow through the hose connection at 104 through the duct 101 to the chamber behind the piston 99 which is then in a position to close the vent 98 and allow air to flow through the port 97 behind the piston 95. In this fashion the slider plate 92 will be lifted to open the valves controlling the air and paint flow through the gun. Complete cut-off of paint flow while the machine is cycling or otherwise is accomplished through a master valve under control of the operator and which opens or closes the flow of air under pressure through hose lines leading to the connections 104 of the shut off valves on the several carriages.

The structure of the other gun carriage is much the same except for the arrangement of the valve housing. That is to say, the valve housing indicated at 113 in Figure 11 is positioned on the plate 114 above the rock lever 115.

Here again the rock lever is actuated by a compression spring 116 into engagement with the stop 117 to allow air under pressure to feed through the hose connection 118 past a poppet valve, the stem 119 of which is operatively connected with one end of the lever, and past the vent controlled piston valve whose stem 120 is controlled by the other leg of the lever, to the piston cylinder 121 where the piston stem is connected to a slider plate 122 corresponding to the plate 92 of the first described carriage.

Each carriage includes a back plate 123, as shown in Figure 12, to cooperate with the front plate in receiving the guide track therebetween and supporting a pair of spaced rolls 124 for engagement with the upper surface of the track. At the bottom of the plate 123 a stud 125 pivots a swinging arm 126 on which is supported a roll 127 for engaging the lower edge of the track. A lateral ear 128 on the arm 126 projects through a slot 129 in the plate 123 to seat one end of a coil spring 130 bearing at the other end against an adjustable seat 131. A set screw and lock nut assembly 132 associated with a lug 133 on the plate positions the seat 131 and allows a change to be made in the tension of the spring 130. The spring bearing against the pivoted plate 126 holds the three rollers in proper contact with the opposite edges of the rail, takes up wear and compensates for variations in the distance between the rolls as the carriage travels between the comparatively straight and curved sections of the rails.

Holes as shown at 134 are provided along each side of the back plate 123 for connection through a universal joint to either thereof of the connecting rod 18 which joins the carriage to the reciprocating belt 7. In the case of the two carriages on the top rail 4 only one need be joined to the operating cable provided the carriages are joined together by a connecting rod as shown at 135 in Figure 1. The use of the connecting rod 135 causes the two carriages to move in unison both in the same direction between the ends and the middle of the track. The range of reciprocation of all the carriages is the same and each of the top carriages covers one half of the roof surface. As will be apparent from the showing in Figure 1, as one side carriage moves up, the other moves down and the weight of one balances that of the other. Therefore, the work required of the reciprocating belt is reduced to a minimum and reversal shocks are partially absorbed by the counter-action.

The valve actuating bell cranks 107—115 are each provided with rollers 136 to engage cam abutments near opposite ends of the range of travel to cut off the flow. These cam abutments as applied to the side tracks 5 and 6 may comprise slotted plates 137 as seen in Figure 6 and set screws 138 passing through the slots rigidly hold the abutments in adjusted position on the tracks. It will be understood, of course, that the position of the abutment members 137 will be dependent upon the length of the surface to be covered so that although the gun carriages may overrun the distance across the surface, the flow of paint will be cut off as soon as the carriage passes beyond the surface. Sufficient overrun is provided to put the reversal of motion of the carriage beyond that portion of the travel in which flow occurs, and to insure a constant speed during the flow period.

In the case of the carriages on the overhead rail 4, the valve actuating abutment in the center of the rail may be in the nature of a strap 140 rigidly secured to the track by screws 141 and provided on its upper surface with a cam formation for engagement with the rock lever on the left-hand carriage and with a cam formation on the underside for engagement with the rock lever of the left-hand carriage. As seen in Figure 11 the relation of the upper and lower cam formations is such that the valves in either case are not cut off until the center is reached, there being preferably a slight overlap to insure complete coverage.

At each side of the top rail an adjustable cut off abutment is provided in order to take care of the variation in distance across the roof from front to rear. For this purpose the abutment may be mounted as shown in Figure 4 where the numeral 144 indicates a plate with which the rock lever 107 engages and which is slidably mounted upon pins 145 extending through a pair of spaced elongated slots 146 with a retracting spring 147 connected to one end and a flexible strap 148 connected to the other end and adapted to pass over a pulley 149 as seen in Figure 1 and to be connected to any suitable fixed portion of the frame. The abutment 150 at the opposite end of the track is of the same construction and by reason thereof the upward movement of the track 4 in conformity with longitudinal curvature will tension both straps 148 and slide the cam abutments 144 and 150 outwardly against the tension of their respective springs and thereby lengthen the interval during which the spraying of paint is being effected. Downward movement of the rail 4 will, of course, relieve tension on the straps 148 and allow the cam rails to be returned under influence of their springs 147.

Thus the travel of the several guns automatically follows paths conforming to body contour in proper spaced relation to the surface and the feed of paint occurs only during travel over the surface to be coated. As a result uniform coverage with no waste is had.

If only one color is being sprayed on all bodies, as is done with the initial priming coat and a second filler coat, there is no need for interchangeability of guns. On color coats, the feature of interchangeability will enable one machine to be used for several colors. Where the speed of the conveyor line and spacing between succeeding bodies is such that there is insufficient time to make the change, additional gun carrying units may be erected in side by side relation, with provision for their selective drive from one chain and connecting rod assembly. This is done by making the upper sheave or sheaves, each in the form of a drum with the cable wound a few turns around the drum for imparting motion to a shaft to drive other sheaves thereon. A dog clutch at each color unit would enable operation of whichever unit is desired. In this case the segmental chain ramp can be extended to reach all of the gun carrying units so each will follow the roof and side sweeps as the segment profile passes under the roof rails with the possibility of more than one unit working at the same time.

Whereas according to the above description movement of the side tracks 5 and 6 is dependent upon the movement of the roof track 4 there may be provided as a modification additional profile cams similar to those shown at 50 and 51 for engagement by a suitable carriage or follower to which the operating cables 82 and 83 are connected. This would enable a more accurate control of side track movement for shifting the track more nearly in conformity to body side wall contour. Alternately the traveling dolly may be provided along both sides with longitudinally curved rails of the same shape as the body side walls to guide the side tracks 5 and 6 and thus maintain the guns at the proper given distance from the body surface.

Instead of using the cable 148 to connect the slidable cut off member 150 with a fixed part of the frame for varying the point of cut off in relation to the height of the overhead track 4, there may be provided a swinging lever pivotally mounted on the track with a connection at one end to the abutment 150 and with a roller at the other end adapted upon movement of the track to ride on a fixed camming plate and thereby swing the lever to shift the abutment. The cam development of the plate surface would cause the cut off points to follow the curved outer margin or drip edge of the roof.

Duplicate chain ramps conforming to body contour at each side of the machine can be replaced by a single ramp at one side only to operate suitable track elevating mechanism. For example, the opposite ends of the track 4 may be supported on the ends of a pair of spaced levers fixed on a rock shaft extending across the frame with one of the levers bearing on the ramp follower 41.

In addition the contour ramp engaged by the follower 41 may be driven in direct relation to the speed of conveyor travel by the elimination of the motor drive heretofore described and the substitution of motion transmitting mechanism operated directly from the conveyor. For this purpose there may be positioned on the floor adjacent the path of the moving bodies an endless chain connected through suitable gearing with the drive sprocket 54 and provided with a number of dolly engaging arms through which the chain is moved forward as the automobile body travels through the machine.

I claim:

1. A machine for applying a surface coating on an automobile body or the like while the body is moving on a conveyor line, a reciprocating applicator, a movable track guiding the applicator in its reciprocation, and means operating in timed relation to the movement of the body to vary the position of the track with reference to body contour so that uniform spacing of the applicator and body surface is maintained throughout the coating operation.

2. For coating a surface on a moving body, which is non-planar in contour in the direction of movement, an applicator, and movable cam means driven in timed relation to the movement of the body for moving the applicator in a direction at right angles to the surface in conformity with surface contour as the body proceeds in its movement.

3. For coating a longitudinally and transversely curvilinear surface on a moving body, a movable track extending transversely of the direction of body movement and having a contour substantially conforming to the transverse contour of the surface, an applicator supported on said track for travel across the surface and track operating means acting in relation to body movement to shift the track in or out in conformity to changes in longitudinal contour of the surface as the movement of the body presents the surface to the applicator.

4. For association with a moving conveyor, a machine for applying a surface coating to a body carried on the conveyor and whose surface to be coated is curved in the direction of conveyor movement, said machine including an applicator device adapted for movement back and forth in a direction transverse to the direction of conveyor movement, a guide track supporting said applicator device for relative movement thereon and being itself shiftable toward and away from the conveyor and means operating automatically for shifting said guide track to maintain the path of transverse movement of the applicator device in given relation to the surface presented thereto in the movement of the body on the conveyor.

5. A surface coating machine for use with a conveyor adapted to carry bodies whose surface to be coated is curved in the direction of conveyor travel, said machine including an applicator, a track supporting the applicator for reciprocation in a direction transverse to conveyor travel, and means acting automatically in relation to the curvature of the surface to shift the track in a direction at right angles to the paths of both conveyor travel and applicator reciprocation and thereby maintain the applicator in given spaced relation to the curved surface presented thereto throughout conveyor travel.

6. Means to vary the position of a track in relation to rate of travel of a conveyor to maintain a given spacing between a surface coating device reciprocable on the track and the longitudinally curved surface of a body carried by the conveyor, said means comprising a cam rail having a bearing face contoured to follow the general curvature of the surface to be coated, means to move said rail in timed relation to conveyor travel and a cam follower adapted for operative connection with said track.

7. Means to vary the position of a track in relation to rate of travel of a conveyor to maintain a given spacing between a surface coating device reciprocable on the track and the longitudinally curved surface of a body carried by the conveyor, said means comprising track supporting structure and including a ramp contoured to conform generally to longitudinal curvature of said surface, means adapted for connection with said track and to ride said ramp, and means imparting relative movement of the ramp and track at the rate of conveyor travel.

8. Means to vary the position of a track in relation to rate of travel of a conveyor to maintain a given spacing between a surface coating device reciprocable on the track and the longitudinally curved surface of a body carried by the conveyor, said means comprising a shiftable cam follower operatively connected with the track, a series of cam rails differing in contour and conforming individually to the general curvature of a surface to be coated, selector means for shifting said cam follower into operative engagement with a selected cam rail and drive means for the relative movement of the track and rails at a rate related to the rate of conveyor travel.

9. In a machine for coating simultaneously the longitudinally curved walls of a body while the body is traveling a conveyor line, a vertically movable transversely extending track adapted to guide a reciprocatory applicator, a transversely movable vertically extending track also adapted to guide a reciprocatory applicator, means associated with one of said tracks to move the same in relation to wall curvature for maintaining the applicator guided thereby in given spaced relation to the surface being coated and motion transmitting connections between the tracks for the movement of one through the other in unison.

10. In a machine for coating simultaneously the curved top and sides of a body traveling a conveyor line, a vertically movable top track to guide a reciprocatory applicator, a pair of transversely movable side tracks to guide reciprocatory applicators, means to raise or lower the top track automatically in relation to the curvature of the top surface of the body to maintain given spacing therebetween, and means to transmit the vertical movement of the top track for the transverse movement of both side tracks in substantial conformity to side wall contouring.

11. In a machine for coating simultaneously the curved top and sides of a body traveling a conveyor line, a vertically movable top track to guide a reciprocatory applicator, a pair of transversely movable side tracks to guide reciprocatory applicators, and means operating in relation to conveyor travel for moving the several tracks in conformity to the changing contour of the body presented to said applicators.

12. In a machine for applying a surface finish on the curved top and side walls of a body while the body is traveling a conveyor line, side and top tracks conforming in shape to the transverse surface contour of the body, guide means for the several tracks to accommodate their movement inwardly or outwardly in relation to the direction of conveyor travel, a series of applicators mounted for reciprocation on said tracks in spaced relation to the wall surface and means acting in relation to longitudinal surface contour of the body for moving said tracks in their guides to maintain said spaced relation substantially uniform from end to end of the surface to be finished.

13. For coating a surface which is wider at one point than another, a traveling conveyor with which the surface moves, an applicator adapted to reciprocate across the surface transversely to the direction of conveyor travel, valve operating means for cutting off the flow of surface coating material near each end of the stroke of the applicator, and means acting on the valve operating means to vary the interval of flow automatically in relation to the width of the surface being coated.

14. The combination with a traveling conveyor to carry a body, whose surface to be coated is curved in the direction of conveyor travel and differs in width in relation to the curvature, of a reciprocating applicator, a track to guide the applicator in the movement transverse to the direction of conveyor travel, means for moving the track in a direction to and from the conveyor to follow the curvature of the surface as it is conveyed to the applicator valve operating means controlling the interval of flow of coating material between opposite ends of the reciprocation, and means controlled by variation in track position to vary the action of said valve operating means and change the length of the flow interval.

15. In combination with a traveling conveyor to carry a body which tapers in width and height, means to apply a surface coating to said body, including a reciprocating applicator having valve operating means to control the flow of coating material, a guide track supporting the applicator and extending transversely to the direction of conveyor travel, means to move the track to and fro to follow automatically the contour of the body and maintain the applicator in given spacing to the surface, a trip device movably mounted on the track and adapted for engagement with said valve operating means to cut off flow of coating material through said applicator and means for moving said trip device upon track movement to change the interval of cut off.

16. Means for spraying opposite sides of a body at the same time, including a traveling conveyor to carry the body, a pair of transversely spaced vertically disposed tracks between which the body moves, spray guns guided for reciprocation by said tracks, power drive means common to said guns, and connections between the drive means and the respective guns so arranged that the guns travel simultaneously in opposite directions in counter-balanced relation.

17. Means for spraying the top and sides of a body, including in combination with a traveling conveyor to carry the body, an overhead track extending transversely of the direction of conveyor travel, a pair of transversely spaced tracks extending vertically on opposite sides of the conveyor, reciprocable spray guns guided by said tracks, driving means common to the several guns with connections to the guns on the side tracks for their counterbalancing action, and a connection to one of a pair of guns on the overhead track, and a drag link connecting said pair of guns for their unisonal movement and spacing the guns apart a distance less than the length of the reciprocatory stroke of the guns to insure an overlap of gun travel at adjacent ends of their respective strokes.

18. Means for spraying the top and sides of a body, including in combination with a traveling conveyor to carry the body, an overhead track extending transversely of the direction of conveyor travel, a pair of transversely spaced tracks extending vertically on opposite sides of the conveyor, reciprocable spray guns guided by said tracks, means acting automatically as the body moves under the overhead track for moving the overhead track in a vertical direction in relation to body contour, means mounting each side track for movement in and out, elastic means bearing on each side track to resist outward movement and motion transmitting connections between each side track and the overhead track for the outward movement of the side tracks in unison with the upward movement of the overhead track.

TRACY F. BRACKETT.